United States Patent
Gribel et al.

(10) Patent No.: US 9,436,422 B2
(45) Date of Patent: Sep. 6, 2016

(54) SYSTEM AND METHOD FOR PRINTER EMULATION ON A COMPUTING DEVICE NOT BEING CONNECTED TO THE PRINTER

(75) Inventors: Staffan Gribel, Gothenburg (SE); Peter Jonsson, Gothenburg (SE)

(73) Assignee: SATO HOLDINGS KABUSHIKI KAISHA (JP)

( * ) Notice: Subject to any disclaimer, the term of this patent is extended or adjusted under 35 U.S.C. 154(b) by 39 days.

(21) Appl. No.: 13/576,210

(22) PCT Filed: Feb. 10, 2010

(86) PCT No.: PCT/JP2010/000831
§ 371 (c)(1),
(2), (4) Date: Jul. 31, 2012

(87) PCT Pub. No.: WO2011/099064
PCT Pub. Date: Aug. 18, 2011

(65) Prior Publication Data
US 2012/0293823 A1    Nov. 22, 2012

(51) Int. Cl.
   *G06F 3/12*     (2006.01)

(52) U.S. Cl.
   CPC .......... *G06F 3/1285* (2013.01); *G06F 3/1205* (2013.01); *G06F 3/1256* (2013.01)

(58) Field of Classification Search
CPC ............ G06F 17/212; G06F 17/2247; G06F 3/1204; G06F 3/1246; G06F 3/1248; G06F 3/1285; G06F 3/1297; G06F 3/1205
USPC ...... 358/1.13, 1.15; 717/100, 134, 138, 139, 717/168, 172, 177
See application file for complete search history.

(56) References Cited

U.S. PATENT DOCUMENTS

| 7,058,536 | B2 * | 6/2006 | Gabriel ........................ 702/120 |
| 7,533,381 | B2 | 5/2009 | Ando .............................. 718/1 |
| 7,812,978 | B2 * | 10/2010 | Ando et al. .................. 358/1.13 |

(Continued)

FOREIGN PATENT DOCUMENTS

| CN | 100377011 C | 3/2008 |
| JP | H 06-110626 | 4/1994 |

(Continued)

OTHER PUBLICATIONS

"A Guide to Smart Printing Understanding the Capabilities, Use Cases and Advantages of Smart Printers," 6 pages, Intermec Technologies Corporation, 2009.

(Continued)

*Primary Examiner* — Benny Q Tieu
*Assistant Examiner* — Juan M Guillermety
(74) *Attorney, Agent, or Firm* — Ostrolenk Faber LLP

(57) ABSTRACT

A system and method are provided for accurately emulating a printer on a computing device that is not connected to the printer. The computing device is provided with firmware and programming code that interfaces with the firmware for a customized printing operation. The firmware is provided with the printer and the computing device. The programming code is provided with the computing device, and the computing device runs the programming code. The programming code interfaces with the firmware provided with the computing device and causes the computing device to emulate the printer, when the printer runs the programming code. The computing device and the printer are not connected.

22 Claims, 17 Drawing Sheets

(56) References Cited

U.S. PATENT DOCUMENTS

| | | | | |
|---|---|---|---|---|
| 2002/0159086 | A1* | 10/2002 | Shinomiya et al. | 358/1.13 |
| 2004/0015885 | A1 | 1/2004 | Akatsuka | 717/134 |
| 2004/0255263 | A1 | 12/2004 | Ando | 717/100 |
| 2005/0128501 | A1* | 6/2005 | Choi et al. | 358/1.13 |
| 2006/0058103 | A1* | 3/2006 | Danieli | A63F 13/12 463/42 |
| 2006/0070087 | A1 | 3/2006 | Ando et al. | 719/320 |
| 2006/0174249 | A1* | 8/2006 | Taniguchi et al. | 718/104 |
| 2007/0046820 | A1* | 3/2007 | Mead | H04N 17/04 348/180 |
| 2007/0124510 | A1* | 5/2007 | Ando | G06F 8/68 710/8 |
| 2007/0134041 | A1 | 6/2007 | Uchiyama et al. | 400/62 |
| 2007/0143089 | A1 | 6/2007 | Sakai et al. | 703/13 |
| 2008/0123135 | A1* | 5/2008 | Inoue | 358/1.15 |
| 2008/0250385 | A1 | 10/2008 | Sanchez | 717/100 |
| 2009/0228862 | A1 | 9/2009 | Bertelrud et al. | 717/100 |
| 2011/0026042 | A1* | 2/2011 | Cogan et al. | 358/1.2 |
| 2011/0209137 | A1* | 8/2011 | Berg | G06F 3/1204 717/171 |

FOREIGN PATENT DOCUMENTS

| | | |
|---|---|---|
| JP | 2004-312711 | 11/2004 |
| JP | 2007-286676 | 11/2007 |
| JP | 2008-160388 | 7/2008 |
| JP | 2009-064422 | 3/2009 |
| KR | 2002-0001978 | 1/2002 |
| WO | WO 2005/080086 A1 | 9/2005 |

OTHER PUBLICATIONS

International Search Report dated Apr. 21, 2010 issued in corresponding international patent application No. PCT/JP2010/000831.
European Search Report mailed Jul. 15, 2013 in counterpart European Application No. 10843670.8.
Written Opinion and Search Report mailed Nov. 14, 2013 in counterpart Singapore Application No. 201205766-7.
First Examination Report mailed Feb. 27, 2013 in counterpart New Zealand Application No. 601686.
Office Action issued Nov. 22, 2013 in counterpart Korean Application No. 10-2012-7023165, along with an English translation thereof.
Patent Examination Report No. 1 issued Jun. 27, 2013 in counterpart Australian Application No. 2010345994.
Mikio Takashi et al., "Printer Simulator—Virtual Printer," OKI Technical Review, vol. 64, pp. 85-88, Aug. 1998.
Japanese Office dated Feb. 18, 2014 in counterpart Japanese Patent Application No. 2011-514964, along with an English translation of relevant portions thereof.
Mikio Takashi, "The Virtual Printer Designer," OKI Technical Review, Apr. 2003, Issue 194, vol. 70, No. 2, pp. 74-77.
Office Action dated Sep. 3, 2014 issued in corresponding Chinese Patent Application No. 201080063543.8 with English translation.
Australian Third Examination Report, dated Mar. 17, 2015, issued in corresponding Australian Patent Application No. 2010345994. Total 4 pages.

* cited by examiner

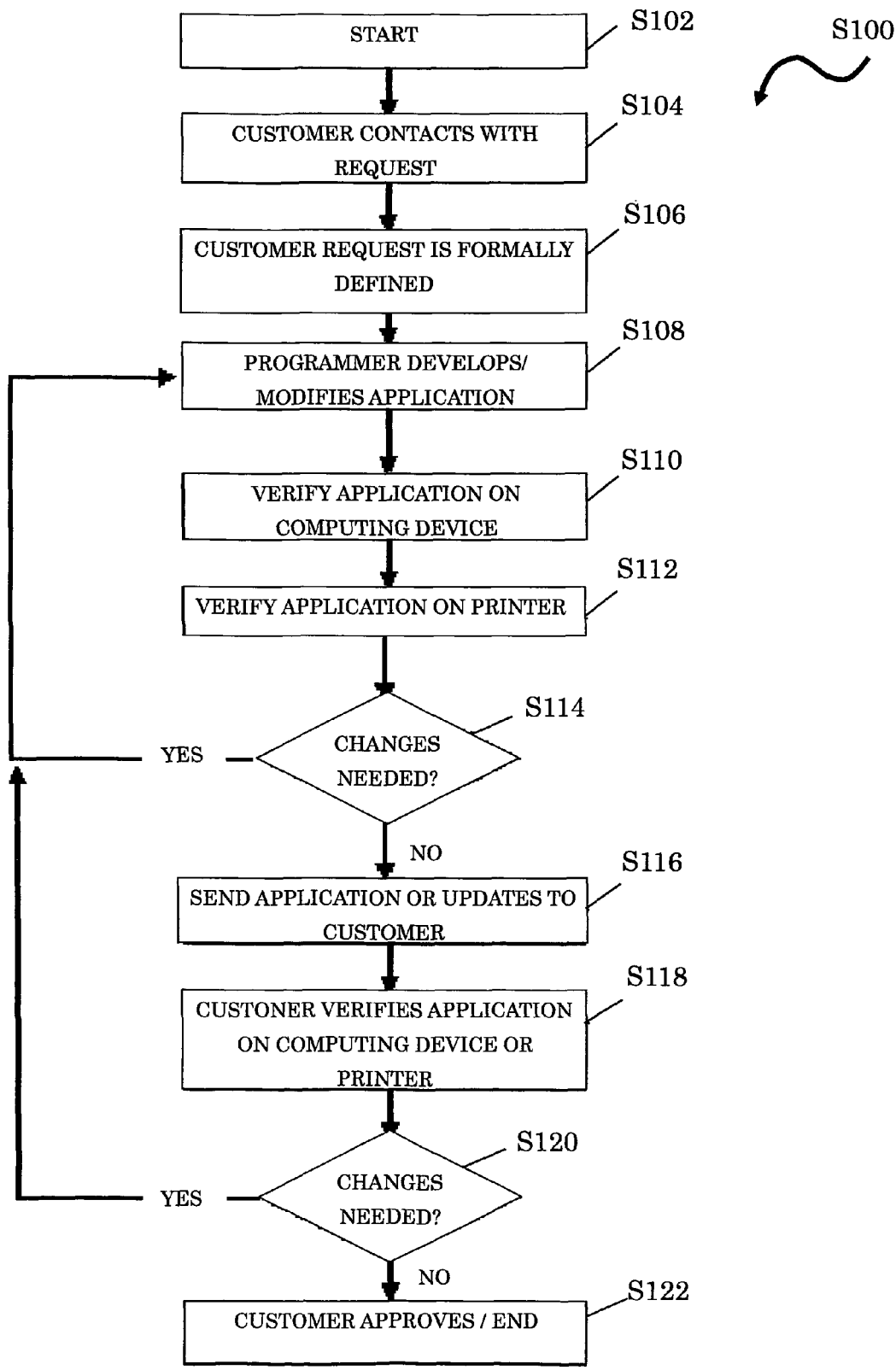

SYSTEM AND METHOD FOR PRINTER EMULATION ON A COMPUTING DEVICE NOT BEING CONNECTED TO THE PRINTER

CROSS-REFERENCE TO RELATED APPLICATIONS

The present application is a 35 U.S.C. §371 national phase application of PCT/JP2010/000831, filed Feb. 10, 2010, and published as WO 2011/099064, the content of which is incorporated in full by reference herein.

FIELD OF THE INVENTION

The present invention relates generally to printers and, more particularly, to providing accurate print emulation and preview functionality.

BACKGROUND OF THE DISCLOSURE

The use of computing devices to prepare electronic files, such as labels, documents, data reports, or other formatted output remains prevalent. Prior to outputting an electronic file or other electronic information to an output device, such as a printer, users desire to preview how the document will appear as printed. Many prior art software programs offer a "print preview" feature that displays on a computing device's display screen a previewed representation of printed output. An example print preview solution is described in greater detail in Japanese patent publication H06-110626, entitled PRINTER AND PRINTING SYSTEM USING THE SAME, which is incorporated herein by reference in its entirety.

SUMMARY OF THE DISCLOSURE

Another need for print preview functionality exists for software developers and programmers who write applications that use printers or that generate other printed output. Print preview functionality, however, often cannot represent an actual printing result accurately. This is often because the computing device can not correctly or accurately emulate an actual printer environment. For example, a user creates a particular and previously unknown typeface font on a computing device and uses the font in a document prepared on the user's word processing software. The printing device connected to the computing device does not have any record of the font. Accordingly, when the user selects a print preview option, the computing device displays the font on the display device. When the user outputs a print job that uses the font to the printer, however, the printer is unable to generate the font. Thus, the print preview option provided by the computing device is inaccurate. In order to accurately preview printed output in the prior art, the user has to physically print the file or other output, or needs to be coupled to a printer. This wastes paper or other valuable printed media, consumes time, and/or limits the development environment for the user.

A need for accurate previewing of printed output is particularly high for printed labels. Printed labels continue to be used in many applications, including for shipping and mailing, medical specimen vials, grocery and product inventories, or the like. Unfortunately, previous solutions, such as described in H06-110626, require a user to connect a printing device to a computing device. Furthermore, the connected printing device requires special firmware that expands the printing image in the printer's image buffer, which is sent back to the computing device for display. This results in wasted printer memory resource.

There remains a desire in the industry for users to preview an accurate representation of printed matter, without a need to connect a printing device Accordingly, a system and method are provided for accurately emulating a printer on a computing device that is not connected to the printer. The computing device is provided with firmware and programming code that interfaces with the firmware for a customized printing operation. Moreover, the firmware is provided with the printer and the computing device, and is operable on each of the computing device and the printer as a function of at least one respective application programming interface. One application programming interface may be provided with the printer and another application programming interface may be provided with the computing device, or both the computing device and the printer may be provided with the same application programming interface.

The programming code is provided with the computing device, and the computing device runs the programming code. The programming code interfaces with the firmware provided with the computing device and causes the computing device to emulate the printer, when the printer runs the programming code. Moreover, the computing device and the printer are not connected.

Other features and advantages of the present invention will become apparent from the following description of the invention that refers to the accompanying drawings.

BRIEF DESCRIPTION OF DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which:

FIG. 17 is a flow chart that shows steps representing a process associated with receiving an order for a customized label application from a customer and fulfilling the order.

DETAILED DESCRIPTION OF EMBODIMENTS

Example 1

Figure 1:
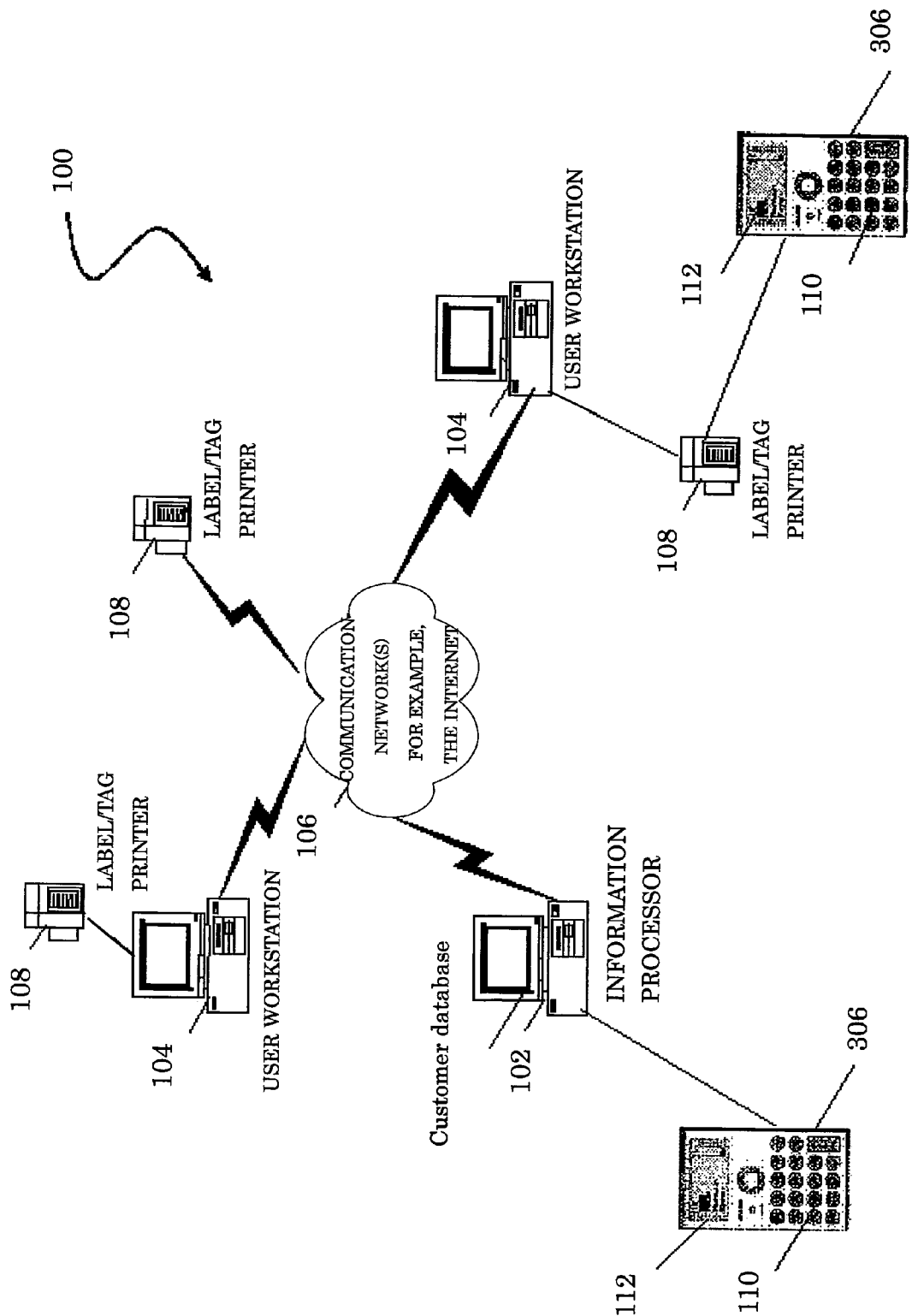
FIG. 1 illustrates an exemplary hardware arrangement in accordance with an embodiment, for developing and emulating a printing environment over a communication network.

In a preferred embodiment, a printer is emulated as a function of a shared printer firmware operable via one or more application programming interfaces ("APIs") and that enable custom and extended functionality. In a preferred embodiment, an interpreted scripting language, LUA, is used to generate the firmware and to provide custom printing applications via an integrated development environment. In accordance with the present application, at least one of a printer's firmware, one or more printer's API's and/or printer software applications that are developed and operate on a printer are provided in an integrated development environment that is operable on a computing device. Preferably, the integrated environment includes a graphical user interface that emulates, at least in appearance, a control panel that is provided with the printer.

Thus, one or more software programs that operate on a printer, such as the printer's firmware, a software application, and a printer API, are loaded on the computing device and operate in an integrated environment. The integration of the printer software with the graphical user interface provides users with accurate print preview representations of printed output because the same software (e.g., firmware, API's and/or application(s)) that operate on the printer operate on the computing device, as well. Preferably, one or more printer API's are designed such that the application and shared firmware execute on both the printer itself, and on the computing device (e.g., a personal computer operating the MICROSOFT WINDOWS operating system), thereby enabling a true emulation of the printer. The teachings herein provide a new and non-obvious printer emulation, at least because injected code functions to access any part of a developed printer software application and/or the shared firmware via one or more API's.

Thus, the teachings herein include software that operates effectively on a computing device in the same way as if it was provided with an actual, physical printer. Users, particularly developers of software for the respective printers, view an accurate representation of the printer's functionality as well as an accurate preview of printed output on the user's display device, even though the display device is provided separately from the physical printer. In this way, the development environment does not suffer from the shortcomings described above with regard to prior art print preview functionality.

In an embodiment, a printer application is written in LUA, which is a platform independent language and developed in the C programming language. Computer and printer interaction with LUA is done through an interface, such as the C API. By using the C API, LUA based operations perform the same way on various platforms, including a printer platform and a computing (e.g., MICROSOFT WINDOWS) platform. In order to achieve an accurate printer emulation on a computing device, the C API should function similarly or the same way on both platforms. On a computing device, such as a personal computer running the MICROSOFT WINDOWS operating system, a file system is provided by the operating system. In accordance with the teachings herein, a file system API is provided for a printing device. Preferably, a file system API is used on both platforms (e.g., a computing device and a printing device) to ensure identical behavior as a software application executes on the respective platforms. Preferably, both a computing device and printing device are provided with a LUA virtual machine (as known in the art) and a C API, such that when a software application is loaded on either platform, such as via memory card, USB connected device, transferred over a network, or the like, the application is recognized by the C API and it runs consistently. Accordingly, the application runs the same way on the computing device as it does on the printing device, thereby eliminating a need to physically connect the printing device to the computing device to observe the application as it runs.

The teachings herein also eliminate the prior art burden of having to physically print labels or other output to observe how printed output will appear. For example, a proprietor of a chain of fast food restaurants needs to create respectively formatted labels for each of a plurality of restaurants in the chain. The proprietor uses the integrated development platform in accordance with the teachings herein to design and preview the labels. The proprietor, thereafter, distributes the label design to each of the restaurants in the chain for generating labels. The labels that are output at each restaurant are accurately previewed by the proprietor. Even though the proprietor does not physically access to the printers used at the restaurants, the preview is accurate. Thus the label production workflow is significantly more efficient than that of the prior art. Moreover, the integrated environment operating on a computing device does not require a printer connected to the computing device that transmits image data back to computing device. Accordingly, the memory resource of printers is conserved.

In a preferred embodiment, an integrated development environment includes a graphical user interface that is operable for designing and/or developing output, such as labels. Preferably, an integrated development environment, for example, for designing data labels for a label and tag printer is provided in combination with a graphical user interface that provides virtual representation of the printer, such as the printer's control panel. The integrated development environment and/or the graphical user interface that represents the printer preferably include the printer's firmware and one or more applications that are executed by the printer. Thus, application development tools are provided that operate on a computing device, such as a personal computer, and that include scripts and/or code libraries that facilitate application development of programs that execute on or by a printing device. This provides improved connectivity capabilities, such as for decentralized and "local" application development by a plurality of parties. In this way, many programmers can work remotely from a centralized office and do not have to be located in close proximity to end-users and customers in order to produce applications that are customized and/or tailored for specific customer needs. This results in shorter lead-time, which represents the time when a request from a client is made to the time when a program is deployed and used by the customer. The systems and methods herein further strengthen relationships with customers and developers.

Preferably, developers of formatted output, such as printed labels, use the teachings herein to develop applications for formatted output. The developers are provided with an accurate virtual or displayed representation of printed output, as well as a virtual representation of the respective output device, such as the printer, that will produce the output. For example, a graphical user interface is provided for developers that includes a representation of the printer control panel (e.g., the LCD and keyboard/keypad) that is provided with the printer for end-users to print labels. In this way, developers can test how a particular printer or other output device will respond for an end-user. For example, the developer can preview how the printer will behave in response to one or keys that are selected by an end-user. Further, the developer is provided with an accurate representation of the liquid crystal display ("LCD") or other display provided with the printing device, in response to one or more key selections made by an end-user. Moreover, the developer is provided with an accurate representation of the physical output that the printer will provide. In this way, the teachings herein simulate and accurately represent output results from a printing device, as well as printer key operation and LCD or other display results on the developer's computing device. This is enabled at least in part by providing firmware that is in the printing device in the developer's computing device. In this way, the physical output (i.e., printing) environment is accurately represented without a need to physically couple an output device or printer to the developer's computing device. Another advantage for developers is that when developing applications (or injected) functions, debugging is done on a computer, thereby eliminating or reducing time-consuming downloads and test prints.

Thus, a plurality of printing solutions are provided by including a printer's firmware source code in a developer's computing device to accurately represent the result of, for example, software developed for proprietary printer control and operations.

Referring now to the drawing figures, in which like reference numerals represent like elements, FIG. 1 illustrates an exemplary hardware arrangement in accordance with an embodiment for developing and emulating a printing environment over a communication network, and referred to herein, generally, as system 100. System 100 preferably comprises at least one information processor 102, which may be configured to operate as an Internet web server and database file server and that is programmed and configured to access communication network 106 and communicate with user workstation(s) 104. User workstations 104 and information processor(s) 102 may communicate via the known communications protocol, Transmission Control Protocol/Internet Protocol "TCP/IP." In the example shown in FIG. 1, information processor 102 is provided with an integrated development programming environment ("IDE"), such as to develop applications in the LUA programming language, as known to those skilled in the art. Information processor 102 is provided with or has access to all databases necessary to support the teachings herein. Information processor 102 is also preferably provided with printer firmware that is installed on printer 108. However, it is contemplated that information processor 102 and/or user workstation 104 can access any required database via communication network 106 or any other communication network to which information processor 102 may be coupled. Communication network 106 is preferably a global public communication network such as the Internet, but can also be a wide area network (WAN), local area network (LAN), an intranet or other network that enables computing devices and peripheral devices to communicate.

In a preferred embodiment, information processor 102 and user workstations 104 are any computer readable medium devices that are capable of sending and receiving data across communication network 106, e.g., mainframe computers, mini computers, personal computers, laptop computers, personal digital assistants (PDA), cellular telephones and Internet access devices such as Web TV. In addition, information processor 102 is preferably equipped with web browser software, such as MICROSOFT INTERNET EXPLORER, MOZILLA FIREFOX, or the like. Information processor 102 is coupled to communication network 106 using any known data communication networking technology.

Also shown in FIG. 1 is printer 108 that is preferably a label and tag printer and operable to print labels and tags of data received from information processor 102. Printer 108 may be provided with keyboard and display to enable input and output functionality with printer 108 in addition to or in the absence of or in conjunction with information processor 102. A keyboard 110 is preferably provided that is operable to receive and interpret (i.e., read) signals from a user using printer 108. The keyboard may be an external keyboard or other input device not directly coupled to printer 108. Moreover, a display 112 is preferably provided that operates to present a variety of textual and graphical content on printer 108. The display may be an external display (not shown) attached to printer 108. Preferably, the display 112 supports a wide selection of fonts and coding types, for example, for many different written languages.

Figure 2:
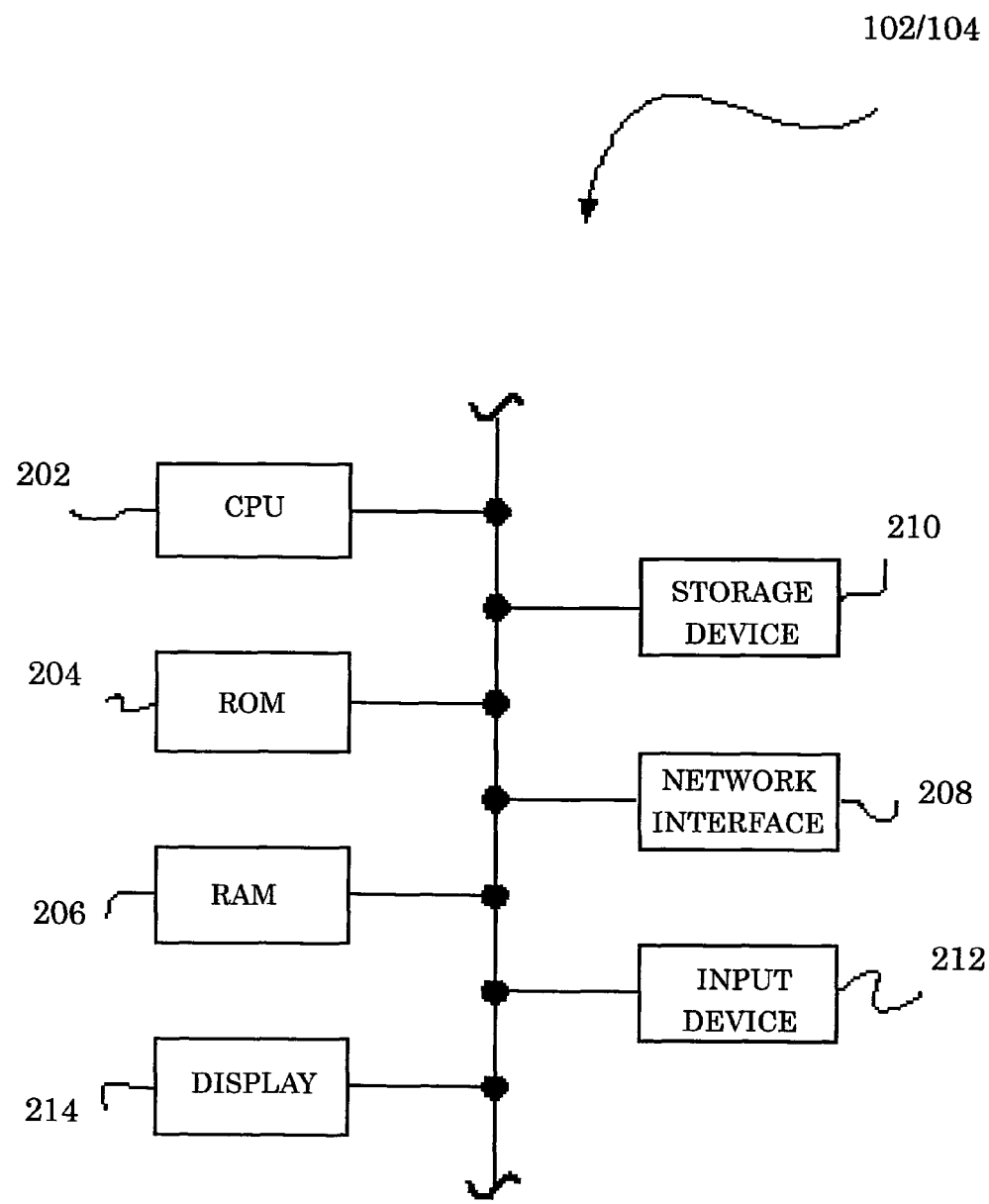
FIG. 2 illustrates the functional elements of an exemplary information processor and/or user workstation shown in FIG. 1.

FIG. 2 illustrates the functional elements of an exemplary information processor 102 and/or user workstation 104, and includes one or more central processing units (CPU) 202 used to execute software code and control the operation of information processor 102. Other elements include read-only memory (ROM) 204, random access memory (RAM) 206, one or more network interfaces 208 to transmit and receive data to and from other computing devices across a communication network, storage devices 210 such as a hard disk drive, floppy disk drive, tape drive, CD ROM or DVD for storing program code databases and application data, one or more input devices 212 such as a keyboard, mouse, track ball, microphone and the like, and a display 214. Further, one or more of functional elements 202-214 may be suitably configured or provided with printer 108, as well.

The various components of information processor 102 and/or workstation 104 need not be physically contained within the same chassis or even located in a single location. For example, storage device 210 may be located at a site which is remote from the remaining elements of information processor 102, and may even be connected to CPU 202 across communication network 106 via network interface 208. Information processor 102 and/or user workstation 104 preferably includes a memory equipped with sufficient storage to provide the necessary databases, forums, and other community services as well as acting as a web server for communicating hypertext markup language (HTML), Java applets, and Active-X control programs. Information processor 102 and/or user workstations 104 are arranged with components, for example, those shown in FIG. 2, suitable for the expected operating environment. The CPU(s) 202, network interface(s) 208 and memory and storage devices are selected to ensure that capacities are arranged to accommodate expected demand.

The nature of the invention is such that one skilled in the art of writing computer executable code (i.e., software) can implement the functions described herein using one or more of a combination of popular computer programming languages, scripting languages and developing environments including, but not limited to, LUA, C, C++, C#, Visual Basic, JAVA, HTML, XML, ACTIVE SERVER PAGES, JAVA server pages, servlets, MYSQL and PHP.

Although the present application is described by way of example herein and in terms of a web-based system using web browsers and a web site server (e.g., information processor 102), system 100 is not limited to such a configuration. It is contemplated that system 100 is arranged such that printer 108 communicates with and outputs data received from information processor 102 and/or user workstation 104 using any known communication method, for example, using a non-Internet browser WINDOWS viewer coupled with a local area network protocol such as the Internet Packet Exchange (IPX), dial-up, third-party, private network or a value added network (VAN).

It is further contemplated that any suitable operating system can be used on information processor 102, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, MAC OS, UNIX, LINUX, PALM OS, POCKET PC and any other suitable operating system.

In a preferred embodiment, printer 108 applications are developed in the LUA programming language. In accordance with a preferred embodiment, a LUA interpreter is included that is operable to process LUA programming statements provided in the applications. Unlike typical high-level programming languages, LUA is a scripting language and not a basic programming language. The teachings herein implement printer APIs that are extensions to the LUA language that interface with the printer firmware and that are interpreted by the LUA interpreter. This enables more advanced and complex applications to be developed, such as via function calls. Furthermore, by implementing APIs that are extensions to the LUA programming language, a portion of printer 108 functionality can be modified, as opposed to prior art label and tag printers that require a complete overwrite of their respective firmware applications in order to implement a single change.

Figure 3:
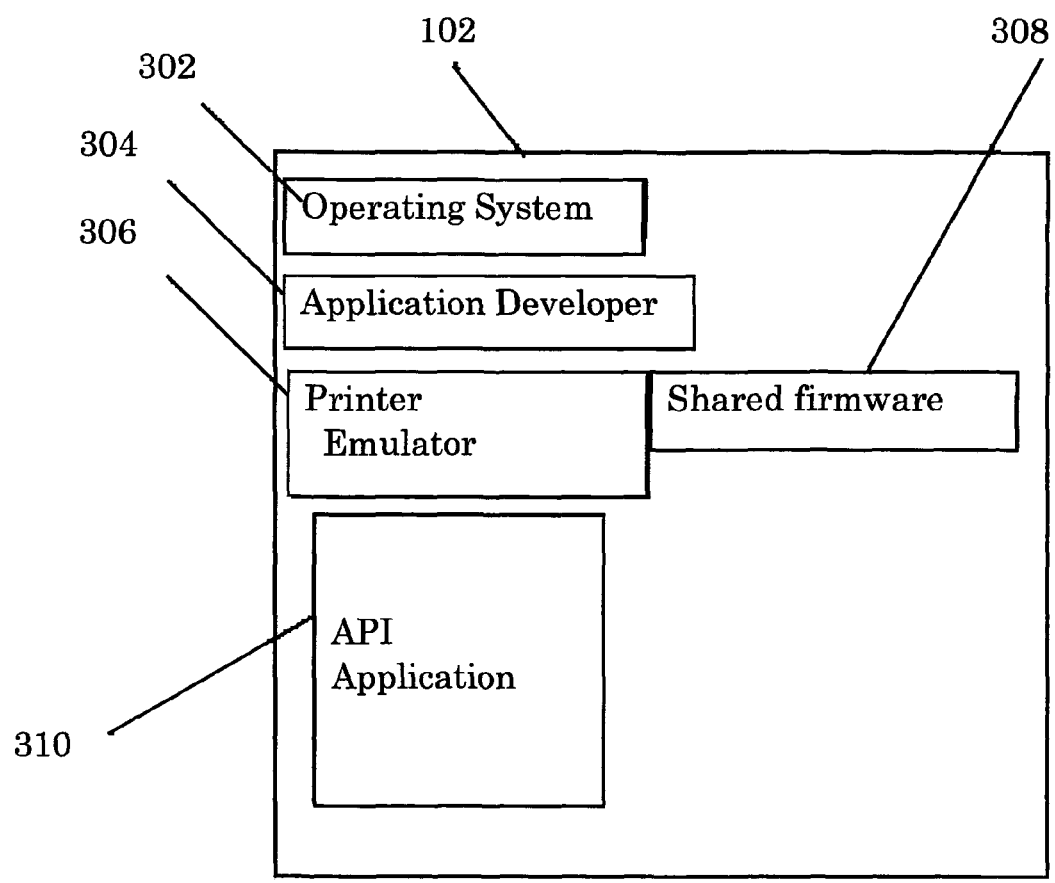
FIG. 3 is a block diagram that illustrates software components that are provided with an information processor, and that is useable for developing and/or using a printer application.
Figure 4:
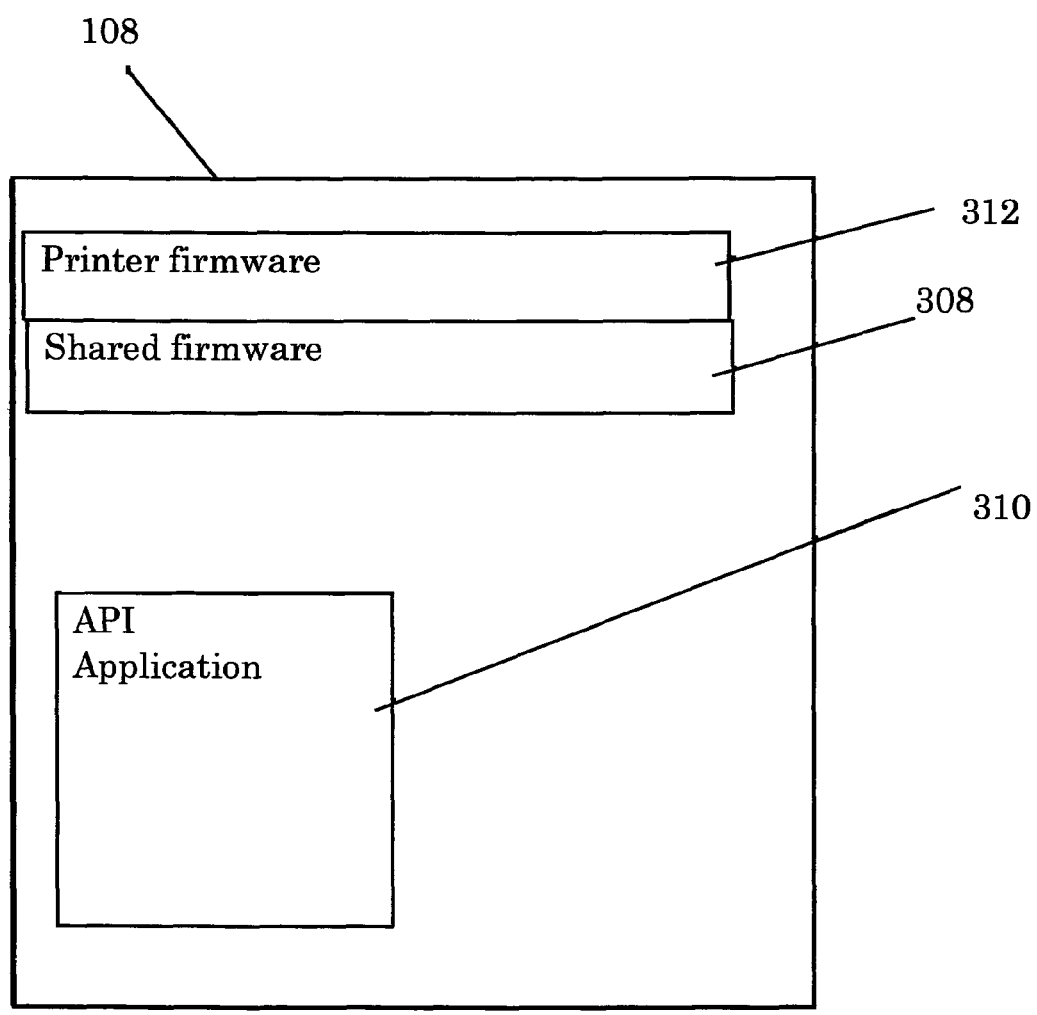
FIG. 4 is a block diagram that illustrates software components that are provided with a printer, and that is useable for developing and/or using a printer application.

FIGS. 3 and 4 are block diagrams that illustrate software components that are provided with information processor 102 and printer 108, respectively, and that are useable for developing and/or using printer applications. In FIG. 3, information processor 102 is represented in box 102, and includes an operating system 302 (e.g., MICROSOFT WINDOWS). Application developer 304 includes, for example, an integrated development environment for developing new or modifying existing printer applications, such as those developed in the LUA programming language and that are deployable to one or more printers 108 for printing formatted output, such as labels. Information processor 102 further includes a virtual printer emulator 306 that is operable to provide a virtual representation of a printer 108 that executes a printer application developed, for example, on information processor 102 via application developer 304. As noted above, the printer's 108 firmware is preferably provided to the information processor 102 that enables the emulator 306 to accurately represent printed output and the way that the printer 108 will function while the application is executing. Moreover, information processor 102 includes an API and printer application 310.

In FIG. 4, a printer 108 such as a label and tag printer is represented in box 108, and includes firmware 312 that is particular to the printing device, and not shared with information processor 102. Also provided with printer 108 is shared firmware 308 that is particular to printer 108, but operates on information processor 102 as well, and that enables printer emulator 306 to be accurate. As noted above, the printer's 108 firmware is preferably provided with information processor 102 that enables the emulator 306 to accurately represent printed output and the way that the printer 108 will function while the application is executing. Moreover, printer 108 includes the API and printer application 310.

Figure 5:
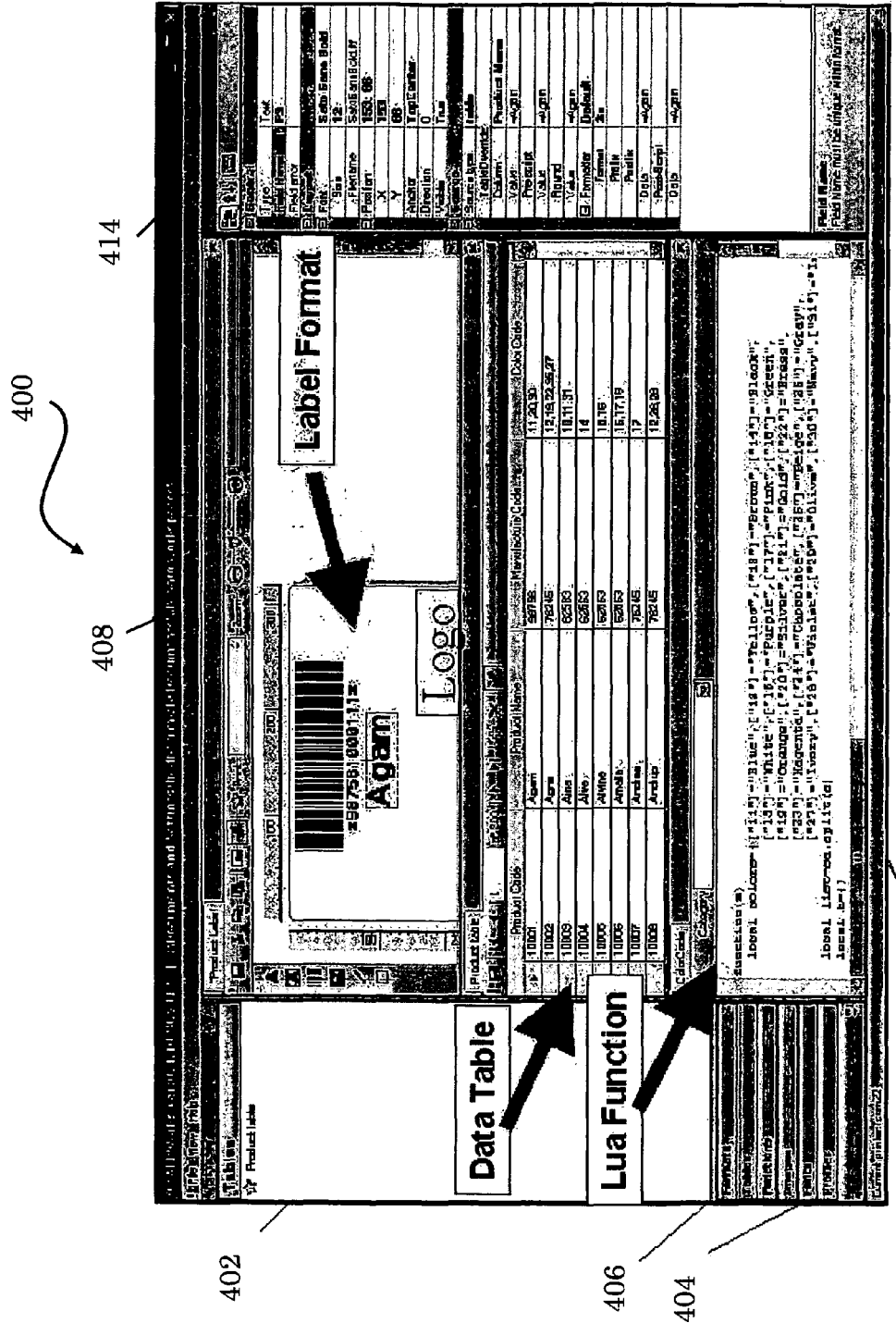
FIG. 5 illustrates an exemplary display screen that is displayed on an information processor and that represents an exemplary embodiment of an application developer.

In a preferred embodiment, information processor 102 is provided with application developer 304 and printer emulator 306 that enable, for example, a software developer to write a printing application for printer 108. FIG. 5 illustrates an example display screen 400 that is displayed on information processor 102 and that represents an exemplary embodiment of application developer 304. In the example shown in FIG. 5, the application developer 304 is provided as an integrated development environment ("IDE"), and used to develop a label application for outputting a plurality of labels on printer 108. As shown in FIG. 5, table section 402 provides a list of one or more data tables that store information to be printed on a label. Options section 404 includes additional application development selections, including for data field entry, label layout options, and data source. In the example shown in FIG. 5, the option "Tables" 406 is selected.

Continuing with reference to FIG. 5, label format section 408 includes interactive graphical screen controls that provide options for designing a label to be output on, for example, printer 108. In the example shown in FIG. 5, a label is being designed for a retail company and the respective label is developed for a product, AGAM. Options are provided for, among other things, font type, lines, boxes, or the like. Data table section 410 includes a display of a respective table of information that is used for inclusion in the designed label. In a preferred embodiment, data tables or other formatted sources of information are provided to information processor 102, such as via FTP, e-mail, physical disk or drive, or the like. In this way, a decentralized source of label data can be managed, without a need for a label application programmer to be physically located nearby to the location where the labels will be eventually printed and/or used.

Continuing with reference to FIG. 5, code generating section 412 is provided for a user of information processor 102 to write programming code that is included in a printing application. In the example shown in FIG. 5, LUA programming statements are displayed, and used to provide color options to be included in a label. Integrating programming code development in a graphical label development platform enables convenient options for developers to accurately and quickly develop printing applications. Further, properties section 414 include options for controlling the appearance and data to appear in printed output, such as a label. In the example shown in FIG. 5, the word, "Agam" is selected and identified in properties section 414 to be in the font type, Sans Bold font, 12 point, at X:Y coordinates 153, 86, and the data for the label is provided from a table, such as displayed in table section 402.

Thus, and as shown in exemplary display screen 400, an integrated development environment that represents application developer 304 is usable for developing an application for formatted printed output, such as a label.

As noted herein, programmed applications that are usable for printing, such as custom data labels, were developed in the prior art by parties who had to be situated physically close to each other. Developers needed access to the end-user's data, as well as to be physically connected to the end-user's printing device 108 in order to test the output and revise the application as necessary. In accordance with the teachings herein, developers no longer have to be tied physically to an end-user's printer 108, and can instead develop printing applications remotely that are integrated with the end-user's data, and that can be tested and evaluated away from the end-user's site, as well.

Figure 6:
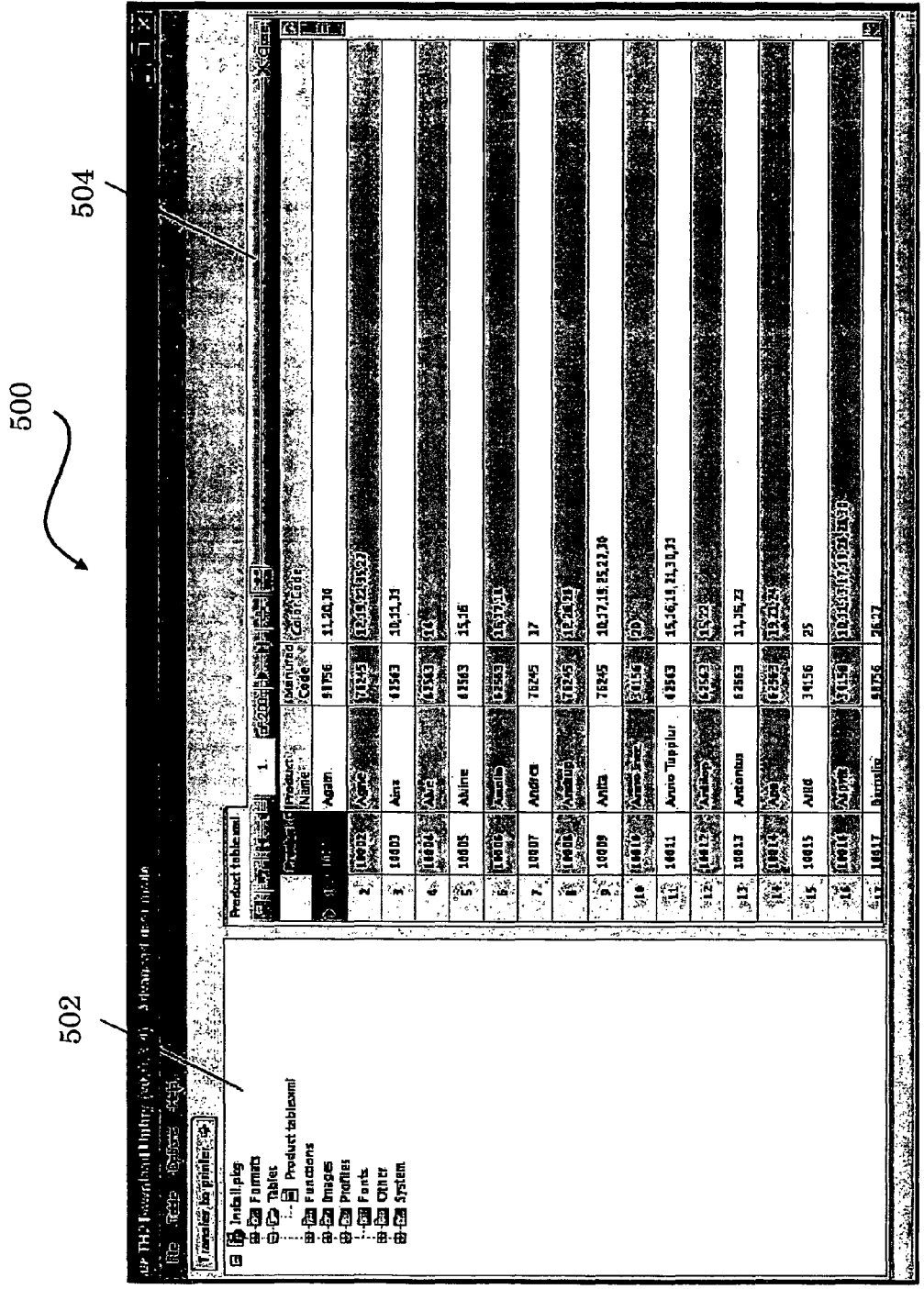
FIG. 6 illustrates an exemplary display screen that is usable for uploading or otherwise integrating a customer's data source for integration in a printing application in accordance with an embodiment.

FIG. 6 illustrates an exemplary display screen 500 that is usable for uploading or otherwise integrating a customer's data for a printing application. Data package section 502 illustrates exemplary options available for application developers, and include options for formatting, data sources, images, profiles, fonts, other and system options. Other options may include translation tables for different languages, function key support (e.g., F1) providing quick access to selectable resources, pre defined settings and power fail storage, including a repository for accumulated values.

Table section 504 illustrates an exemplary data table that has been imported from an exemplary client and includes data for product code, product name, manufacturer code, and color code. Once imported, the data are usable for a custom printing application, such as for data labels, and further is usable for the exemplary customer.

Figure 7:
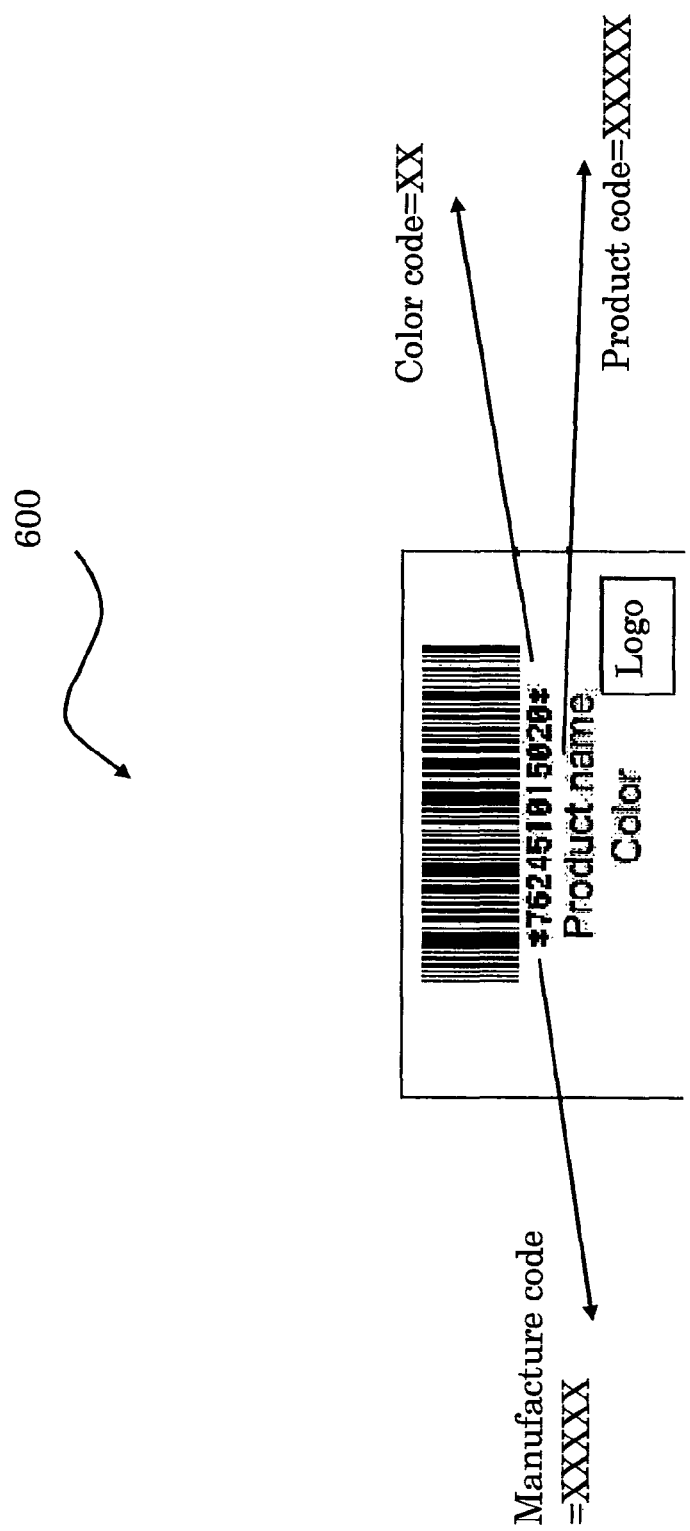
FIG. 7 illustrates an exemplary data label layout that integrates the data to be incorporated in a label.

FIG. 7 illustrates an exemplary data label layout 600 that prints the data provided, for example, in the table shown in table section 504 (FIG. 6). As shown in FIG. 7, a barcode is provided that incorporates a plurality of the data values, such as manufacture code, color code, and product code. Further, the data label incorporates written words, such as to represent the same. Further, a custom logo may be included in the label and that was imported from a client company.

Figure 8:
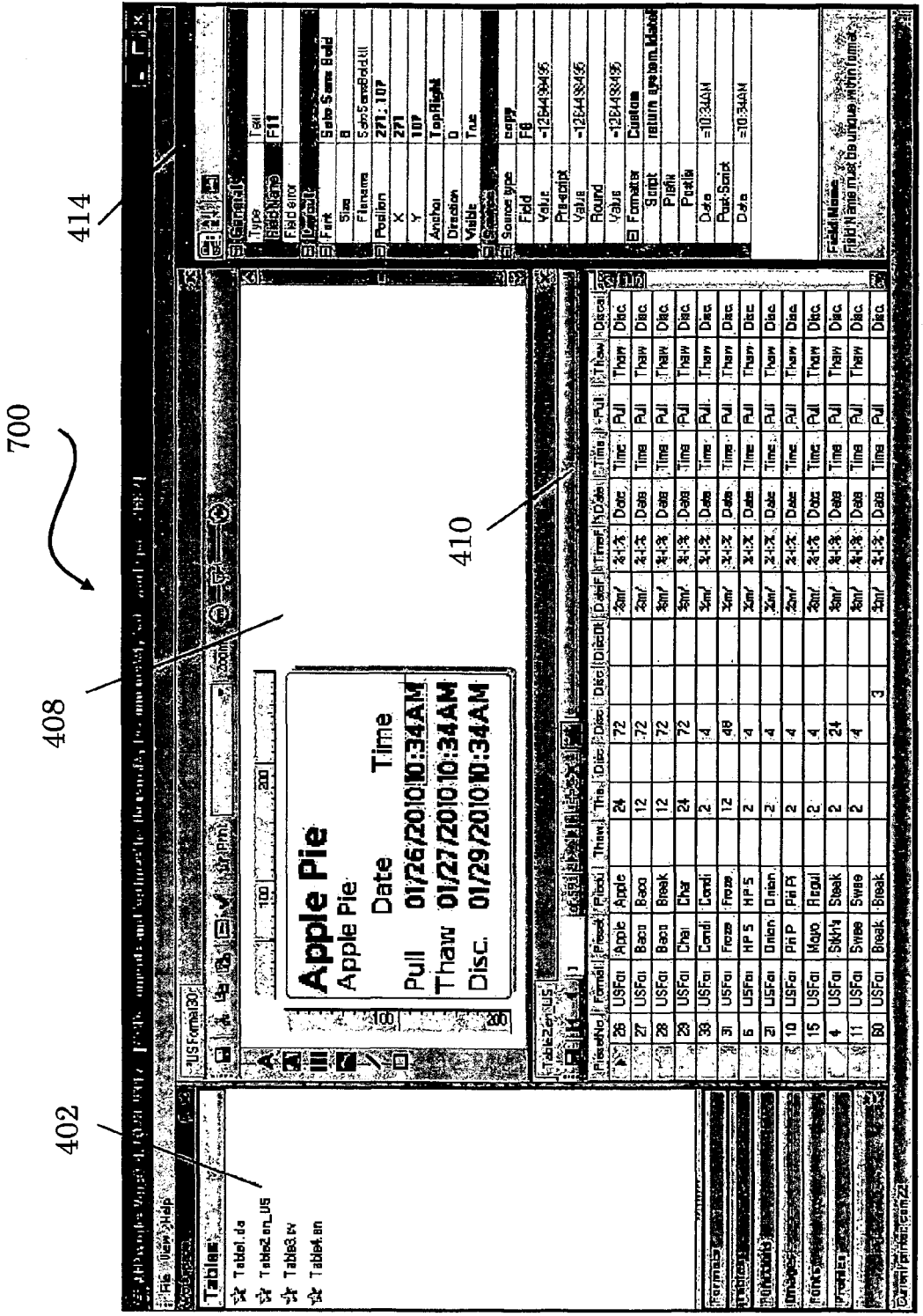
FIG. 8 illustrates an exemplary display screen that represents a use of an application developer and operable on an information processor.

FIG. 8 illustrates an exemplary display screen 700 that represents another use of application developer 304 and operable on information processor 102. In the example shown in FIG. 8, the application developer 304 is used to develop data labels for a food provider. As shown in table section 410, the data shown are for foods, and include apple pie, bacon and other foods. Corresponding data are provided for the amount of time that each of the foods needs to thaw, how long a particular food's shelf life is, or the like. In label format section 408, some of the data in the first row of data are illustrated for apple pie. The respective data fields that have been selected by the programmer for inclusion in the label are the name of the food, a "pull" date and time, a "thaw" date and time, and a "discard" date and time. As the data labels are printed by the customer, corresponding information from each of the respective rows of data from data table section 410 are output in the labels. In the example display screen 700, the code generating section 412 is not displayed, which further illustrates the flexibility of application developer 304. Sections 408, 410, 412 or the like of application developer 304 can be displayed or hidden from view, for example, simply by selecting one or more graphical screen controls (e.g., checkboxes, tabs, radio buttons or the like) by the user.

Figure 9:
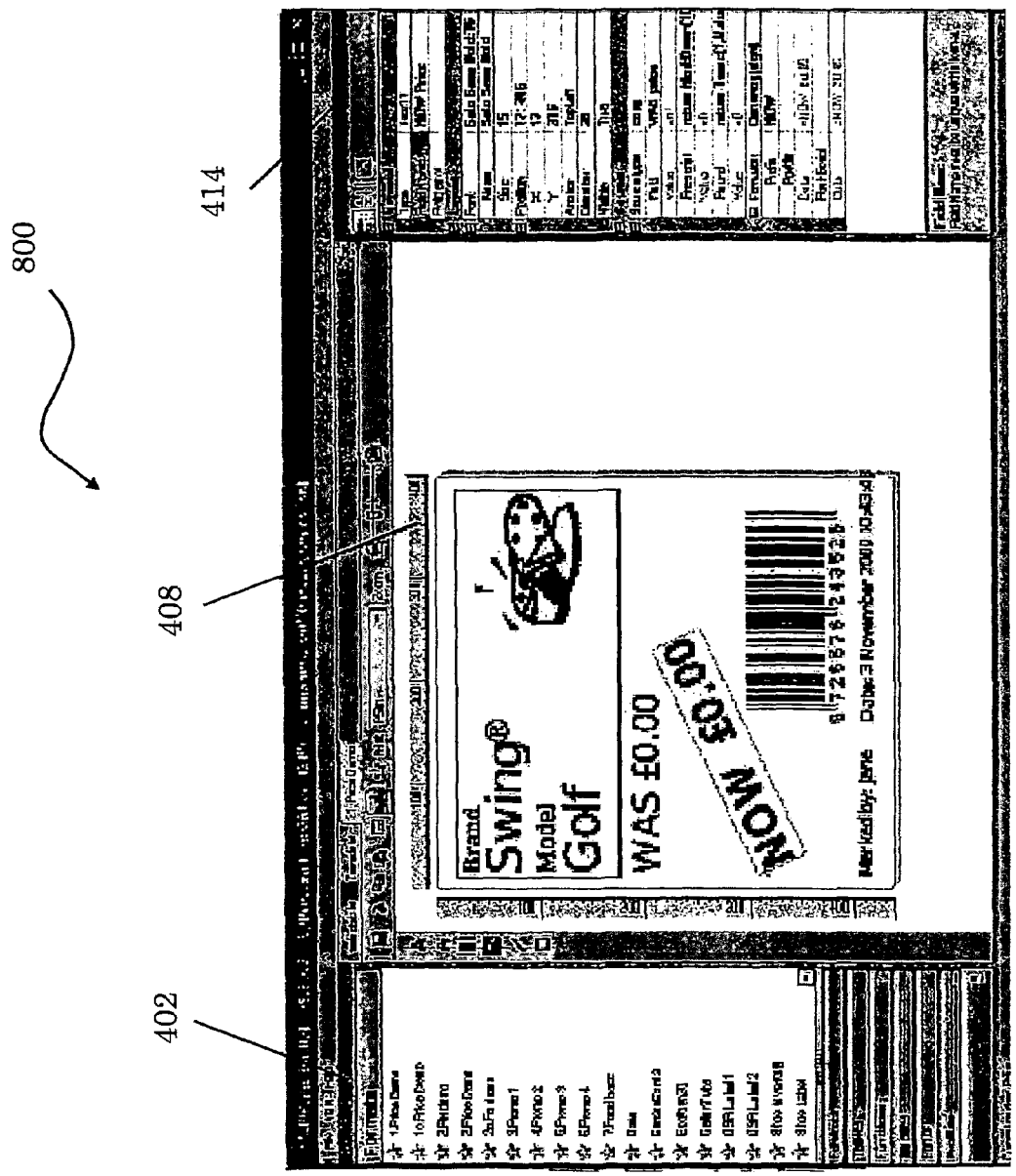
FIG. 9 illustrates an exemplary display screen that represents a use of an application developer and operable on an information processor.

FIG. 9 illustrates an exemplary display screen 800 that represents another use of application developer 304 and operable on information processor 102. In the example shown in FIG. 9, the application developer 304 is used to develop data labels for a sports equipment retailer. In the exemplary display screen 800, the user is designing a data label that includes a plurality of components, including a product image, barcode, brand description, product description, original sales price and current sales price. Moreover, the label is preferably formatted in graphically appealing ways, including with diagonal textual output, respective font types and point sizes, etc. In the exemplary display screen 800, the data table section 410 and the code generating section 412 are not displayed. By enabling the user to turn off the display of those sections, the user can focus his attention on the label's graphic development without the clutter of data and programming code consuming display screen 800.

As noted above, in addition to application developer 304, software is included that operates on information processor effectively in the same way as software provided with an actual, physical printer 108. This enables users to view an accurate representation of a printer, as well as an accurate preview of printed output on the user's display device, even though the display device is located separately from the physical printer.

Figure 10:
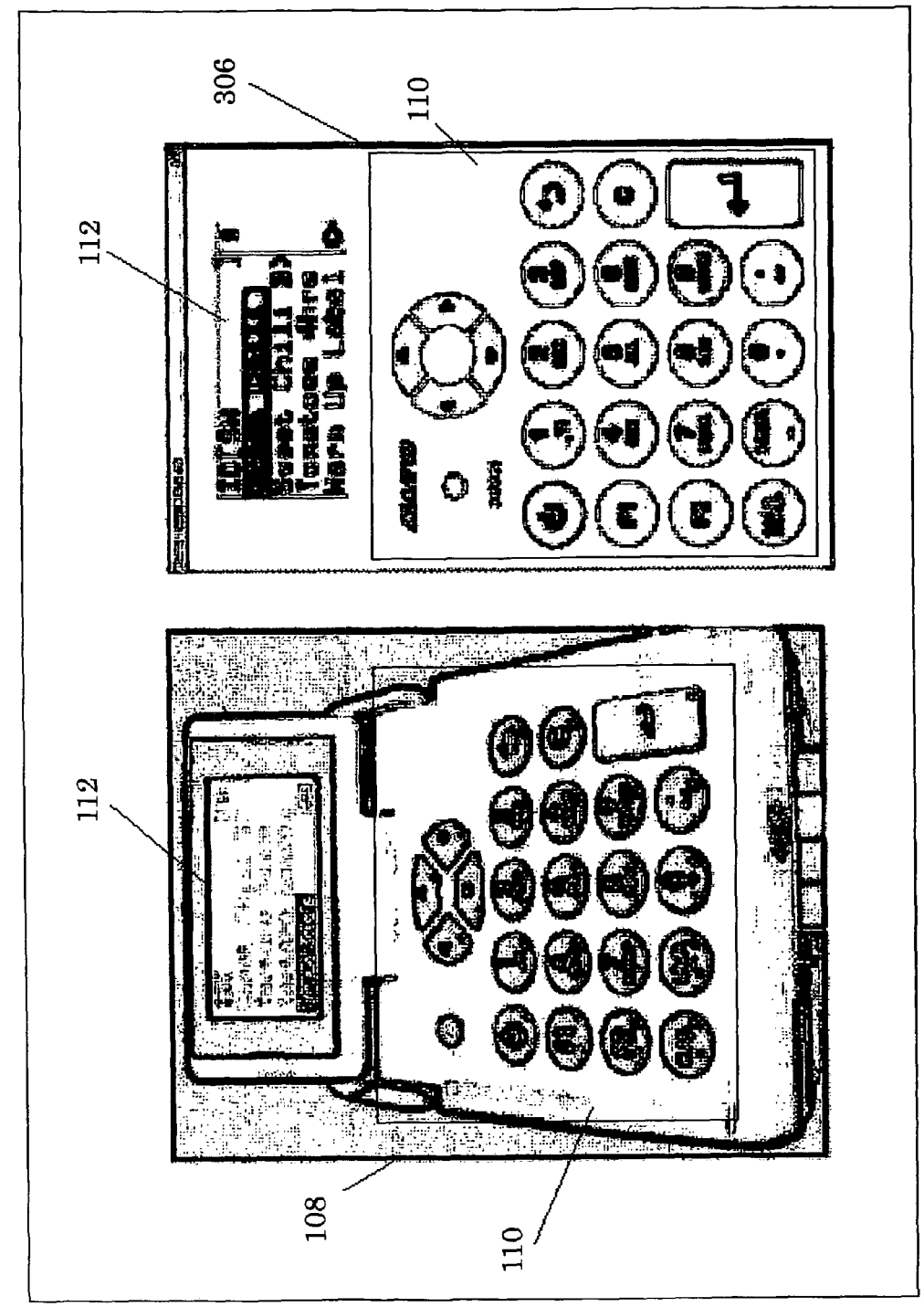
FIG. 10 illustrates the similarity between a physical label and tag printer and a virtual printer emulator.

FIG. 10 illustrates the similarity between a physical printer 108 and printer emulator 306. On the left side of FIG. 10 is an illustration of printer 108, and that includes keyboard 110 and display 112. Printer emulator 306, similarly, includes a virtual representation of the printer 108, including sections 110 and 112. In a preferred embodiment, all of the controls and displays in printer emulator 306 operate as they do on printer 108, and do so accurately as a function of shared firmware 308, which is provided on both printer 108 and emulator 306. Also illustrated in FIG. 10 is an exemplary application that is provided via application developer 304, and that preferably includes prompts in display 112 that can be selected via keyboard 110.

Figure 11:
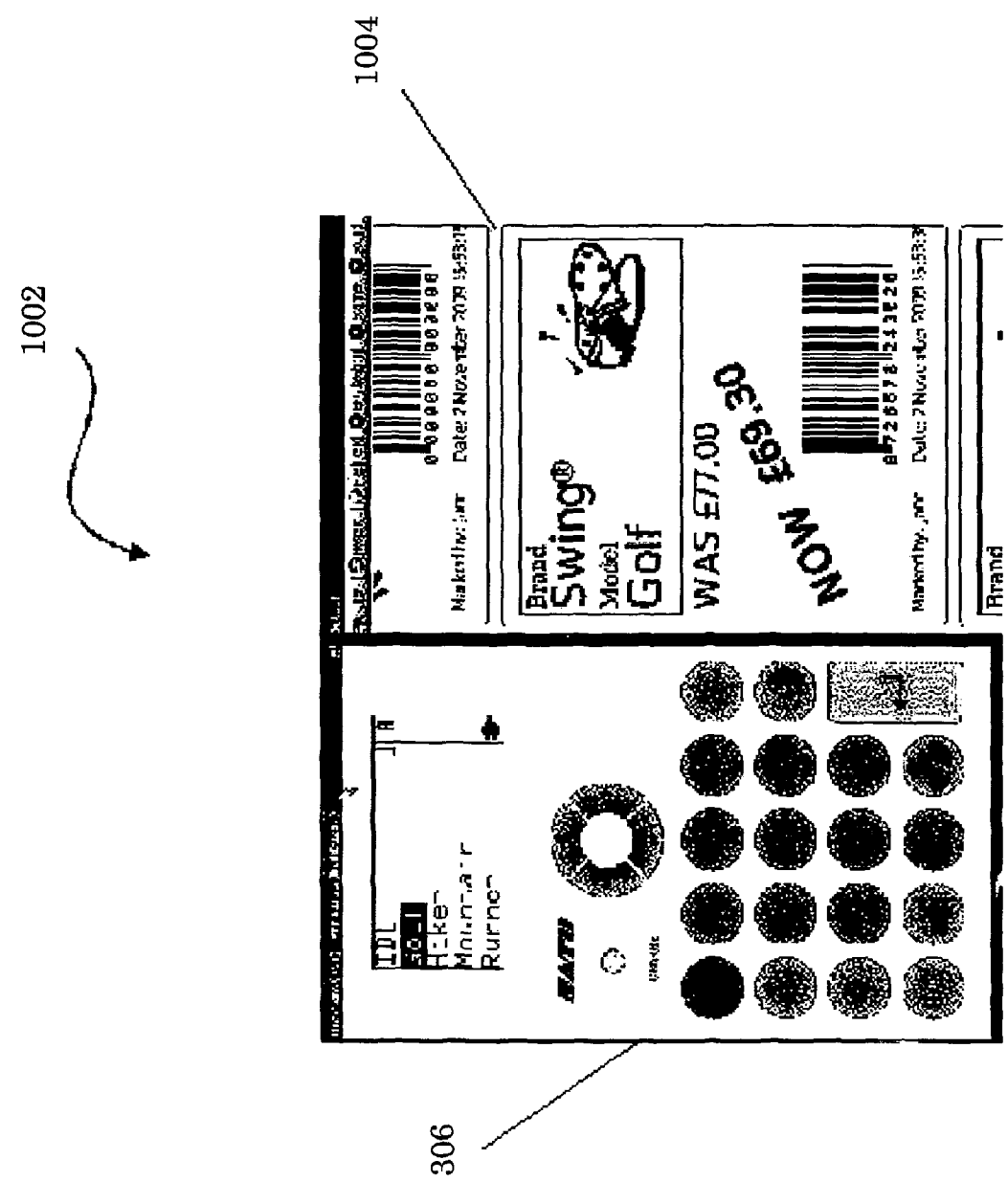
FIG. 11 illustrates an exemplary display of a virtual printer emulator and corresponding previewed label output provided in accordance with preferred embodiments.
Figure 12:
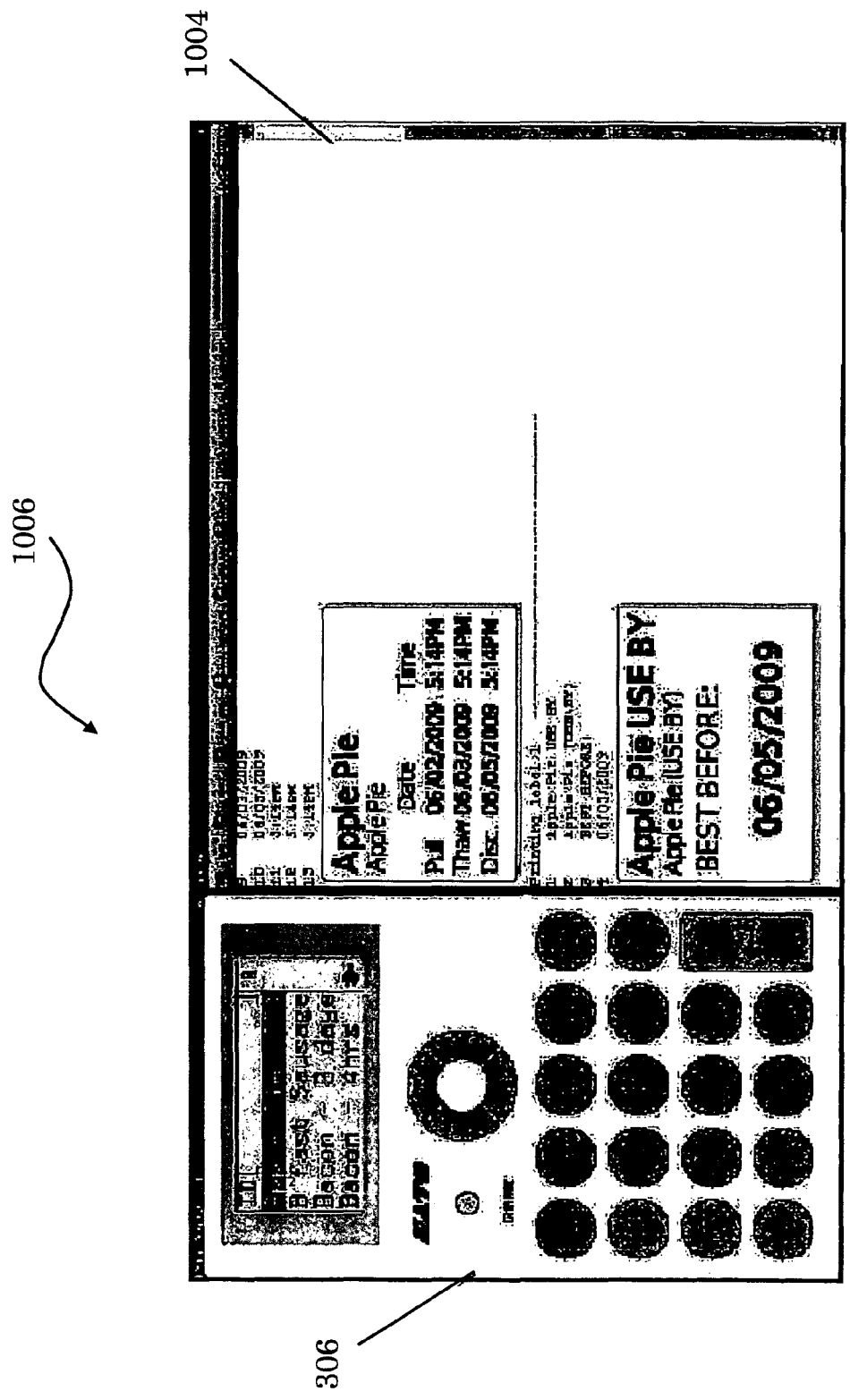
FIG. 12 illustrates an exemplary display of a virtual printer emulator and corresponding previewed label output provided in accordance with preferred embodiments.
Figure 13:
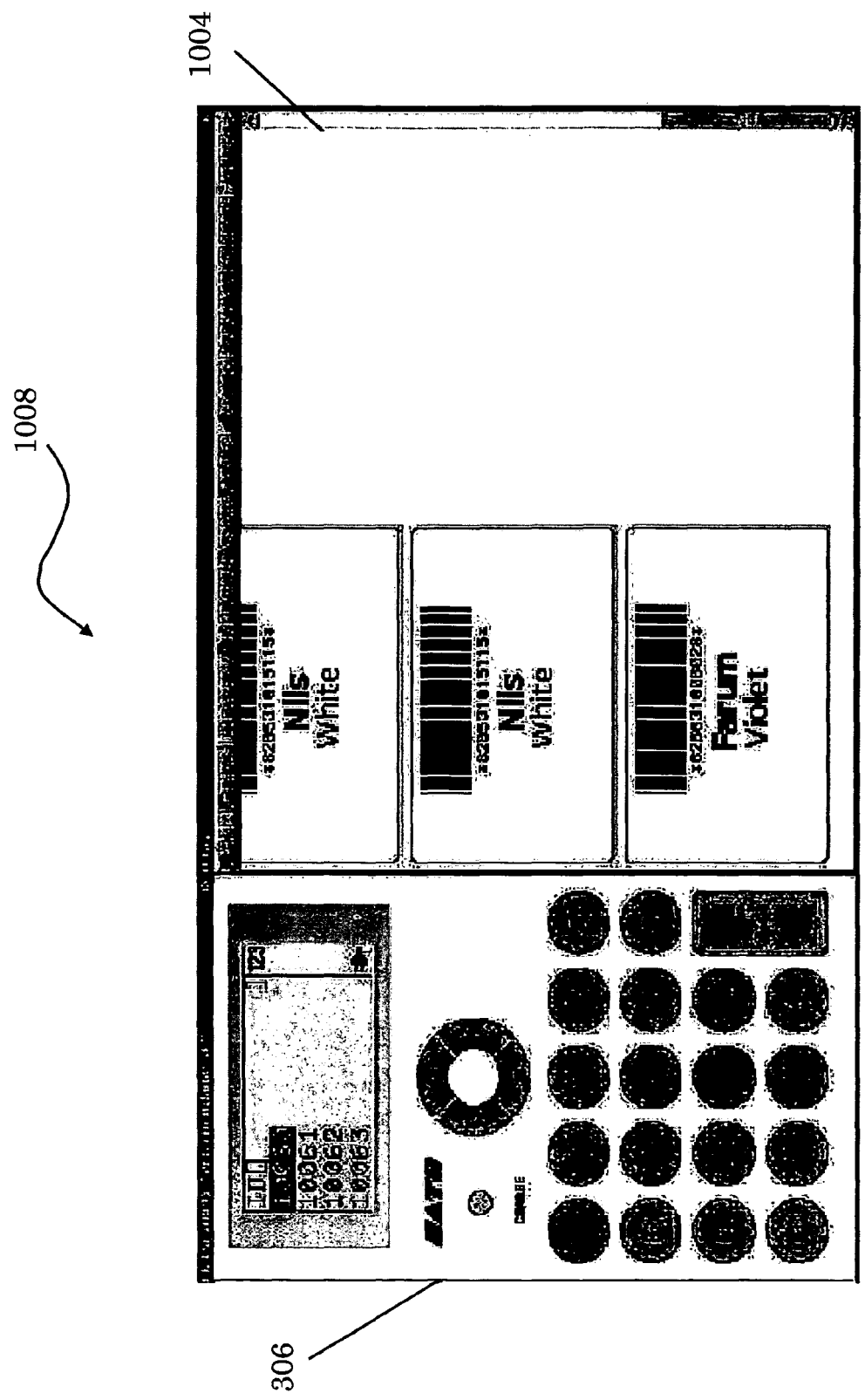
FIG. 13 illustrates an exemplary display of a virtual printer emulator and corresponding previewed label output provided in accordance with preferred embodiments.

FIGS. 11-13 illustrate exemplary displays 1002, 1006 and 1008, respectively, of printer emulator 306 and corresponding previewed label output provided in accordance with preferred embodiments. As shown in FIGS. 11-13, printer emulator 306 is provided in the left portion of display screens 1002, 1006 and 1008, and previewed label output 1004 is provided in the right portion. Each of the display screens 1002, 1006 and 1008 represent a virtual representation of printer 108 outputting labels for different users. For example, display screen 1002 represents labels generated for a sports equipment provider. Display screen 1006 represents labels generated for a food provider, and display screen 1008 represents labels generated for a retail establishment. Each of the example display screens 1002, 1006 and 1008 illustrate output that can be provided in accordance with the teachings herein, including for a plurality of labels (as shown in display screen 1002), a plurality of label types (as shown in display screen 1006), and labels for a plurality of products (as shown in display screen 1008). The output displayed in previewed label output 1004 is an accurate representation of the actual output to be generated by printer 108, at least as a result of the shared firmware that is provided both on information processor 102 and printer 108.

Figure 14:
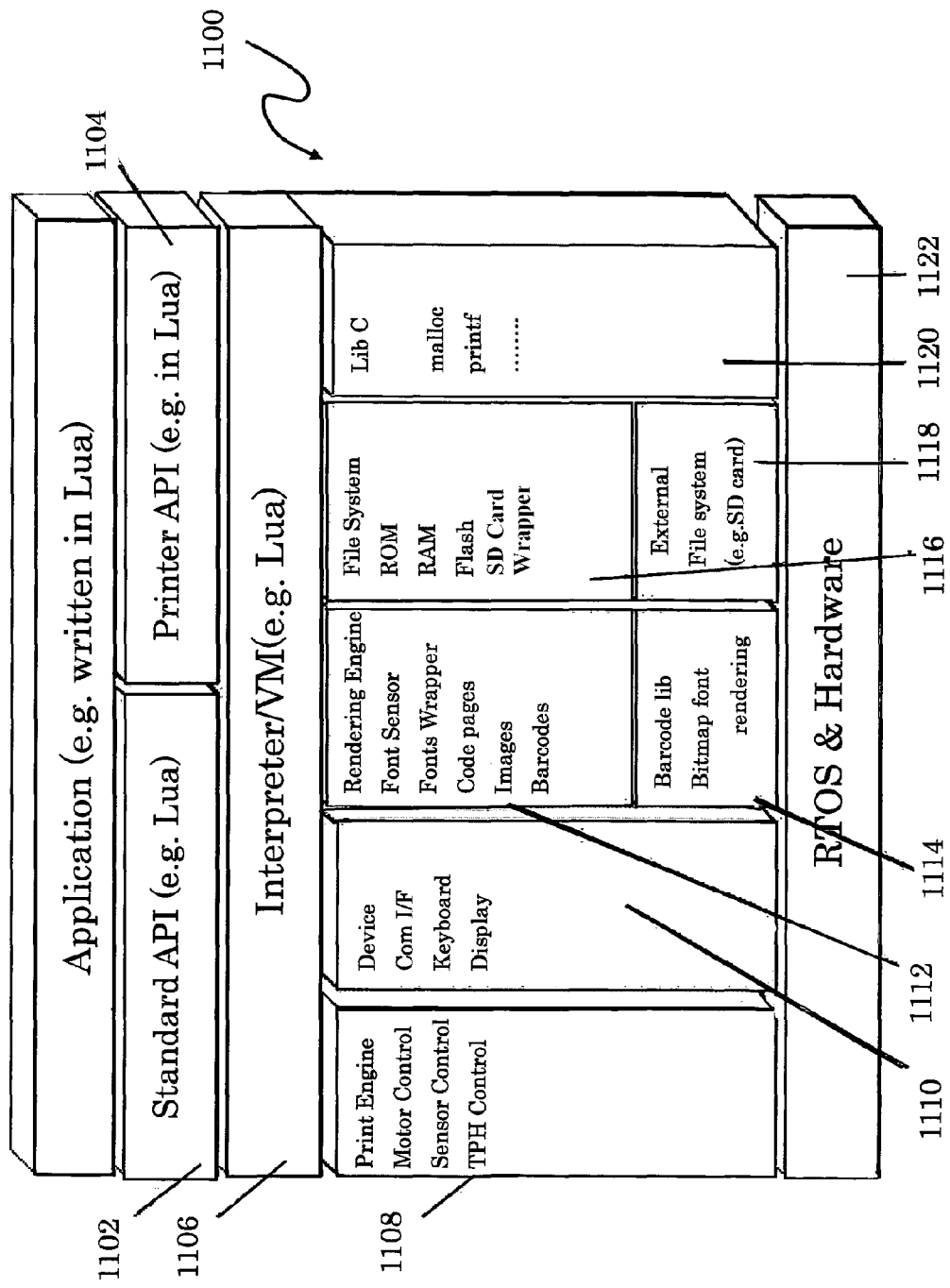
FIG. 14 is a block diagram illustrating exemplary components that may be included in an exemplary embodiment and usable for providing shared firmware.

FIG. 14 is a block diagram 1100 illustrating exemplary components that may be included in an exemplary embodiment and usable for providing shared firmware 308. As shown in FIG. 14, a standard LUA API 1102 and a custom LUA Printer API 1104 are provided that interface with the LUA virtual machine ("VM") 1106. In print engine section 1108, components relating to printer 108 are listed, including the motor control, sensor control and thermal printhead ("TPH") control. In devices section 1110, communication interface ("I/F"), keyboard and display are listed. Render engine section 1112 includes a font scaler, fonts wrapper, code pages, images, barcode wrapper and lines. A barcode library section 1114 may further include bitmap fonts and rendering for respective barcodes. File system section 1116 preferably includes read only memory ("ROM"), random access memory ("RAM"), flash drive, and secure digital ("SD") card wrapper. An SD card file system 1118 may further be provided. Software library ("C") 1120 is further included, and includes custom library components, such as "malloc" and "printf" which may be custom written functions. In addition, a real-time operating system and hardware are provided in section 1122. Use of these components are provided as building blocks for firmware that is preferably provided to information processor 102 and usable for providing accurate print preview and printer emulation for programmers.

Figure 15:
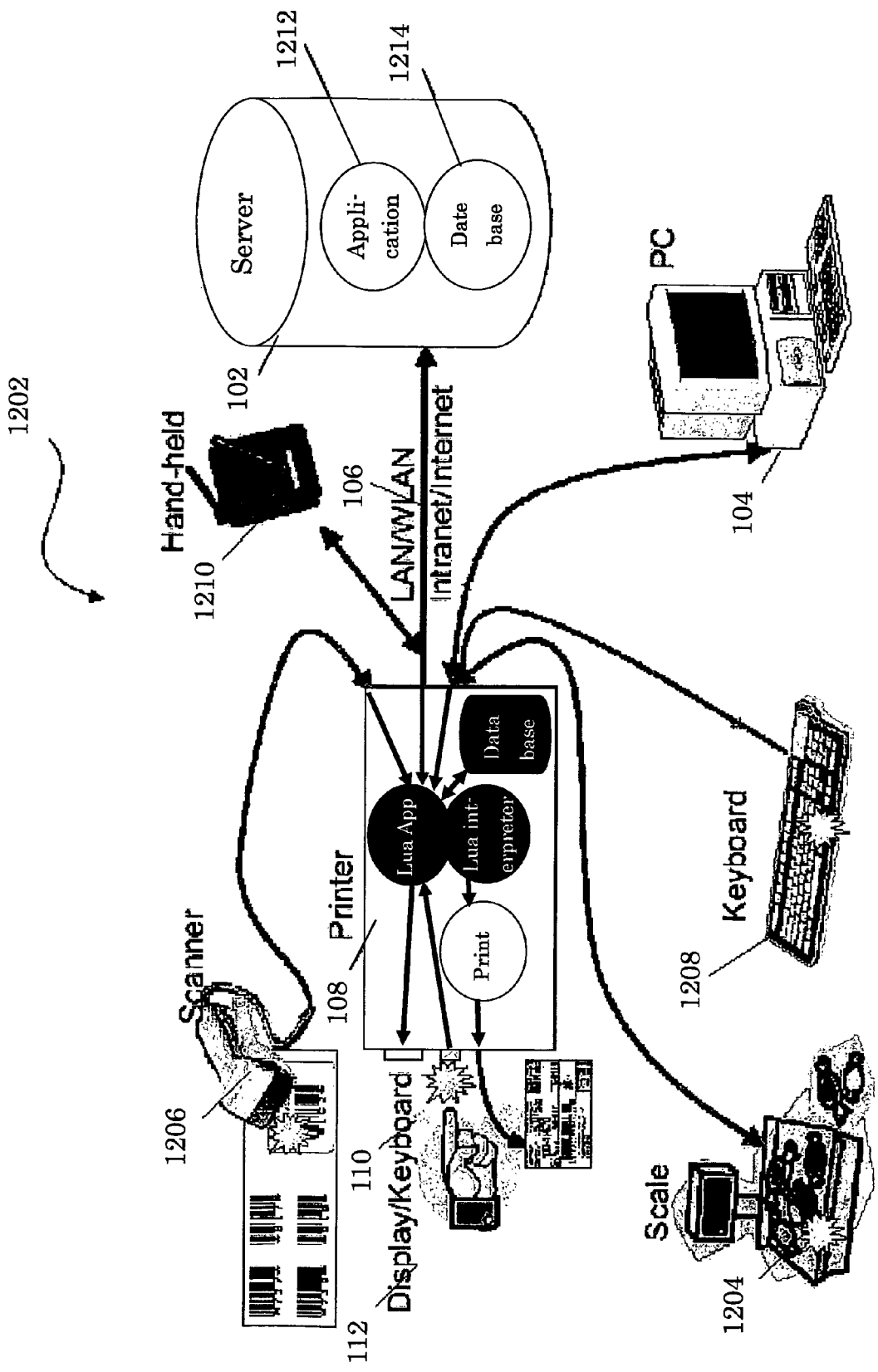
FIG. 15 illustrates an additional exemplary hardware arrangement, in accordance with embodiments.
Figure 16:
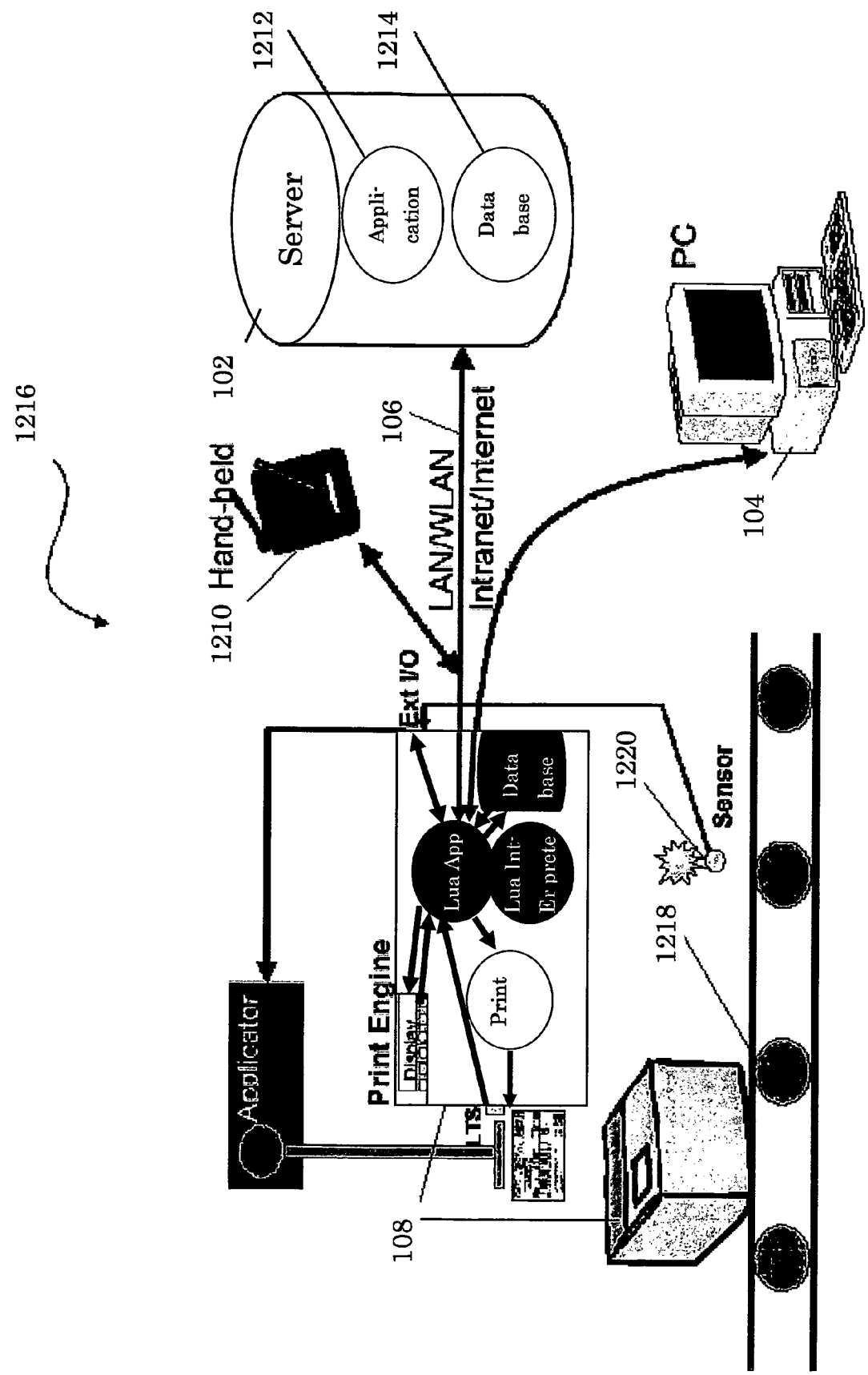
FIG. 16 illustrates an additional exemplary hardware arrangement, in accordance with embodiments.

FIGS. 15 and 16 illustrate additional exemplary hardware arrangements, in accordance with embodiments, wherein a printer 108 is provided with an application developed, for example, by application developer 304. In the example shown in FIG. 15, an arrangement is shown that supports use of a desktop printer 108. In addition to information processor 102, user workstation 104, communication network 106, printer 108, keyboard 110 and display 112, scale 1204 is shown and useable for transmitting information representing the weight of foods or goods to be included in labels generated by printer 108. Moreover, scanner device 1206 is usable for obtaining information from an existing barcode and transmitting the information to printer 108. Other data input devices include keyboard 1208 and handheld device 1210, which may be a PDA. Data and software may be provided via information processor 102, which may store an application 1212 developed via application developer 304, and database 1214, which may store data for a particular business customer. In the example shown in FIG. 15, the application is operable and usable at a particular site, such as a grocery store, retailer or other business, and interfaces with devices typically located at a particular site. The printer 108 generates labels via, for example, a LUA application, which runs via a LUA interpreter, and which may further interface with a database.

FIG. 16 illustrates a hardware arrangement 1216 that is usable in a print and apply ("P&A") printing environment, such as to provide production line labeling. A production line 1218 is provided, which may include sensor 1220 for fast and accurate data transfer and/or recognition.

FIG. 17 is a flow chart that shows steps S100 that represent a process associated with receiving an order for a customized label application from a customer and fulfilling the order so that the application is placed into production. At step S102, the process starts and the customer thereafter formally requests a particular label application (step S104). At step S106, the customer's request is formally defined, for example, by technical personnel capable of describing the customer's request technically for a programmer. The request is transmitted to a programmer who uses the application developer 304 to produce a customized application. At step S108, the programmer uses the application developer 304, for example, to design label formats, create program prompts, associate fields and prompts with data table columns, develop application and printer setup routines, and/or integrate user predefined functions, such as LUA scripts. The programmer may use the application developer 304 to develop a new application or, alternatively, to modify an existing application. Once the application is developed, then the application is verified, for example, via printer emulator 306 (step S110) or with a physical printer 108 (step S112). Thereafter, at step S114, a determination is made whether changes to the application are required. If so, then the process branches back to step S108 and the programmer modifies the application. If not, then the process branches to step S116 and the application is submitted to the customer, such as a file transmitted over communication network 106, provided in an SD card, a compact disc, or other media. The customer verifies the application, either via printer emulator 306 or on printer 108 (step S118). Thereafter, a determination is made whether revisions are needed to the application (step S120). If so, then the process branches back to step S108 and the programmer modifies the application and the process continues from there. If not, then the process branches to step S122, wherein the customer approves the application, payment may be tendered and the process ends.

Thus, as shown and described herein, the present application solves problems associated in the prior art, such as relating to printer emulation and program development. By sharing firmware with a printer and a computing device, an accurate printer emulation is obtained, including providing an accurate print output preview. Moreover, the development cycle for printer software applications is significantly reduced, and engineers and programmers no longer have to be located physically near to end-users. A decentralized, advanced, fast and cost-effective solution is provided for custom tailored printing solutions that were previously unavailable in the prior art. This is provided, at least in part, due to use of a powerful programming and scripting language, such as LUA, that is capable of accessing and interfacing with file systems to provide powerful printer functions, connectivity functionality and improved font and code page handling. The result is a shorter total lead-time and more accurate application solutions provided initially to customers, which improves and solidifies customer relations.

Moreover, very complex print configurations are now possible, particularly for labels, that may include, for example, various colors, logos, database information, barcodes, and operator sequences for an improved workflow. After customer databases are accessed or obtained, and customer requests or requirements are defined, a programmer can use the teachings herein to design a label format that includes the customer's data and custom graphics, and that can be packaged in an application and transmitted to the customer quickly. Moreover, the application can be verified for accuracy, via printer emulator 306.

In one embodiment, customers receive printers that have virtually no predefined functionality, and are essentially "empty" machines. An end-user accesses and downloads a printer application over a communication network via the end-user's computing device. Thereafter, the printer executes programming instructions that provide custom functionality.

Although the present invention is described and shown in relation to particular embodiments thereof, many other variations and modifications and other uses will become apparent to those skilled in the art. It is preferred, therefore, that the present invention be limited not by the specific disclosure herein.

What is claimed is:

1. A method of emulating a printer on a computing device, the computing device not being connected to the printer, and the computing device being provided with a first portion of printer firmware and programming code that interfaces with the first portion of printer firmware for a customized printing operation, the method comprising the steps of:
   providing the first portion of printer firmware to the computing device, the first portion of printer firmware being shared by the computing device and the printer, wherein the first portion of printer firmware is operable on the computing device as a function of at least one application programming interface provided to the computing device, a copy of the first portion of printer firmware being operable on the printer as a function of a copy of the at least one application program interface being executed on the printer, the first portion of printer firmware being different from a second portion of printer firmware, the second portion of printer firmware being provided to the printer, but not being shared with the computing device;
   providing the programming code to the computing device; and
   running the programming code on the computing device so as to emulate the printer running the programming code on the computing device,
   wherein the programming code runs on the computing device and interfaces with the first portion of printer firmware provided to the computing device so as to cause the computing device to emulate the printer running the programming code, thereby accurately representing a printer output and the functioning of the printer, and
   the computing device and the printer are not connected to each other so that image data cannot be transmitted from the printer to the computing device.

2. The method of claim 1, further comprising:
   providing the programming code to the printer; and
   running the programming code on the printer, p1 wherein the printer running the programming code is emulated by the computing device when the computing device runs the programming code.

3. The method of claim 1, wherein the programming code is a label generation software application.

4. The method of claim 3, further comprising:
   generating a signal by the computing device so as to cause an electronic computer display to display a virtual label generated by the programming code,
   wherein the displayed virtual label has a same appearance as a physical label printed as a function of the printer running the programming code.

5. The method of claim 3, further comprising:
   providing an integrated development environment to the computing device; and
   configuring the computing device by the integrated development environment for a user to develop the programming code.

6. The method of claim 5, wherein the integrated development environment includes a label format section, and the method further comprises:
   configuring the computing device for a user to develop a label format on the label format section.

7. The method of claim 6, further comprising:
   providing at least one data source of information for the label; and
   configuring the computing device by the integrated development environment for a user to provide the information for the label when the label is generated by the printer.

8. The method of claim 6, further comprising:
   providing a program code editor for the integrated development environment; and
   configuring the computing device by the integrated development environment for a user to develop the programming code.

9. The method of claim 1, wherein the programming code is written in a scripting language, and running the programming code on the printer modifies a portion of the functionality of the printer.

10. The method of claim 1, further comprising displaying a representation of the printer when the computing device is caused to emulate the printer.

11. A system comprising a printer and a computing device for emulating the printer on the computing device, the computing device not being connected to the printer, and the computing device being provided with a first portion of printer firmware and programming code that interfaces with the first portion of printer firmware for a customized printing operation, the system comprising:
    at least one application programming interface configured to be executed on the computing device, a copy of the application program interface being operable on the printer;
    the first portion of printer firmware being configured to be executed on the computing device, the first portion of printer firmware being shared by the computing device and the printer, wherein the printer firmware is operable on the computing device as a function of the at least one application programming interface, a copy of the first portion of printer firmware being operable on the printer as a function of the copy of the application program interface, the first portion of printer firmware being different from a second portion of printer firmware, the second portion of printer firmware being provided to the printer, but not being shared with the computing device;
    the programming code being configured to be executed on the computing device, wherein the programming code runs on the computing device and interfaces with the first portion of printer firmware on the computing device so as to cause the computing device to emulate the printer running the programming code, thereby accurately representing a printer output and the functioning of the printer;
    wherein the computing device and the printer are not connected to each other so that image data cannot be transmitted from the printer to the computing device.

12. The system of claim 11, wherein a copy of the programming code is provided on the printer, and the printer runs the copy of the programming code, and
    wherein the printer running the copy of the programming code is emulated by the computing device when the computing device runs the programming code.

13. The system of claim 11, wherein the programming code is a label generation software application.

14. The system of claim 13, wherein the computing device is configured to generate a signal for causing an electronic computer display to display a virtual label generated by the programming code, wherein the displayed virtual label appears the same as a physical label printed as a function of the printer running the copy of the programming code.

15. The system of claim 13, further comprising an integrated development environment configured to be executed on the computing device, wherein the integrated development environment configures the computing device for a user to develop the programming code.

16. The system of claim 15, wherein the integrated development environment includes a label format section that configures the computing device for a user to develop a label format.

17. The system of claim 16, further comprising at least one data source of information for the label, wherein the integrated development environment further configures the computing device for a user to provide the information in the label when the label is generated by the printer or by the computing device.

18. The system of claim 16, further comprising a program code editor for the integrated development environment, wherein the integrated development environment provided with the program code editor further configures the computing device for a user to develop the programming code.

19. The system of claim 11, wherein the programming code is written in a scripting language, and running the programming code on the printer modifies a portion of the functionality of the printer.

20. The system of claim 11, wherein a representation of the printer is displayed when the computing device is caused to emulate the printer.

21. A method of providing customized printer software, the method comprising the steps of:
receiving from a first computing device an electronic request for the customized printer software compatible to be run on a printer that is configured with a first portion of printer firmware and a second portion of printer firmware, the first portion of printer firmware being shared by the printer and a second computing device, wherein the request includes at least one specification related to the customized printer software;
developing, on the second computing device, the customized printer software, wherein the second computing device is configured with the first portion of printer firmware, the first portion of printer firmware being different from the second portion of printer firmware, the second portion of printer firmware not being shared with the second computing device;
running the customized printer software on the second computing device so as to verify that the customized printer software satisfies the electronic request;
emulating the printer running the customized printer software on the second computing device when the customized printer software runs on the second computing device, the emulating occurring as a result of the customized printer software running on the second computing device and interfacing with the first portion of printer firmware on the second computing device, thereby accurately representing a printer output and the functioning of the printer;
modifying the customized printer software and running the modified customized printer software on the second computing device when the customized printer software is not verified; and
sending the customized printer software to the first computing device when the customized printer software is verified,
wherein the second computing device and the printer are not connected to each other so that image data cannot be transmitted from the printer to the second computing device.

22. The method of claim 21, wherein the customized printer software is written in a scripting language, and running the customized printer software on the printer modifies a portion of the functionality of the printer.

* * * * *